United States Patent
Chen et al.

(10) Patent No.: US 9,449,011 B1
(45) Date of Patent: Sep. 20, 2016

(54) MANAGING DATA DEDUPLICATION IN STORAGE SYSTEMS

(71) Applicant: EMCCorporation, Hopkinton, MA (US)

(72) Inventors: Xiangping Chen, Sherborn, MA (US); Richard P. Ruef, Santa Cruz, CA (US); Samuel L. Mullis, Raleigh, NC (US); Aron A. Suliman, Harvard, MA (US); Monica Chaudhary, South Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 94 days.

(21) Appl. No.: 13/730,675

(22) Filed: Dec. 28, 2012

(51) Int. Cl.
*G06F 17/30* (2006.01)

(52) U.S. Cl.
CPC .............. *G06F 17/30156* (2013.01)

(58) Field of Classification Search
CPC ............ G06F 11/1453; G06F 17/30156; G06F 3/0641; G06F 3/0608; G06F 11/2089
USPC ........... 707/692, E17.005, E17.007, 679, 707/E17.002, 640, 827, E17.009, 661, 707/E17.01, E17.014, 609, 624, 674, 748, 707/755, 758, E17.032, E17.044, E17.084, 707/610, 639, 649, 651, 652, 654, 667, 678, 707/696, 723, 752, 769, 781, 782, 785, 802, 707/803; 711/162, E12.103, 103, 133, 154, 711/E12.001, E12.017, 118, E12.008, 711/E12.009, E12.019, E12.022, E12.07, 711/E12.071, E12.093, 111, 114, 130, 136, 711/156, 159, 160, 163, 165; 709/206, 204, 709/226, 203, 221, 223, 224
See application file for complete search history.

(56) References Cited

U.S. PATENT DOCUMENTS

| | | | |
|---|---|---|---|
| 8,095,756 B1 * | 1/2012 | Somavarapu | G06F 11/1453 711/162 |
| 8,650,163 B1 * | 2/2014 | Harnik et al. | 707/692 |
| 2012/0089574 A1 * | 4/2012 | Doerner | 707/654 |
| 2012/0150826 A1 * | 6/2012 | Vijayan Retnamma | G06F 17/30312 707/692 |
| 2013/0091102 A1 * | 4/2013 | Nayak | 707/692 |

* cited by examiner

*Primary Examiner* — Jay Morrison
*Assistant Examiner* — Ken Hoang
(74) *Attorney, Agent, or Firm* — Krishnendu Gupta; Jason A. Reyes; Deepika Bhayana

(57) ABSTRACT

A method is used in managing data deduplication in storage systems. A data deduplication process is performed by applying a deduplicating technique to data of a deduplication domain. The data deduplication process is scheduled based on a priority. Characteristics of data deduplication performed by the data deduplication process are evaluated. Based on the evaluation, execution of the data deduplication process is effected.

16 Claims, 8 Drawing Sheets

MANAGING DATA DEDUPLICATION IN STORAGE SYSTEMS

BACKGROUND

1. Technical Field

This application relates to managing data deduplication in storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

Deduplication is a space-saving technology intended to eliminate redundant (duplicate) data (such as, files) on a data storage system. By saving only one instance of a file, disk space can be significantly reduced. For example, a file of size 10 megabytes (MB) may be stored in ten folders of each employee in an organization that has ten employees. Thus, in such a case, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file does not constitute an entirely new file.

While deduplication systems have helped make data management much easier, they also come with a number of challenges, especially when managing the process of deduplicating data.

SUMMARY OF THE INVENTION

A method is used in managing data deduplication in storage systems. A data deduplication process is performed by applying a deduplicating technique to data of a deduplication domain. The data deduplication process is scheduled based on a priority. Characteristics of data deduplication performed by the data deduplication process are evaluated. Based on the evaluation, execution of the data deduplication process is effected.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
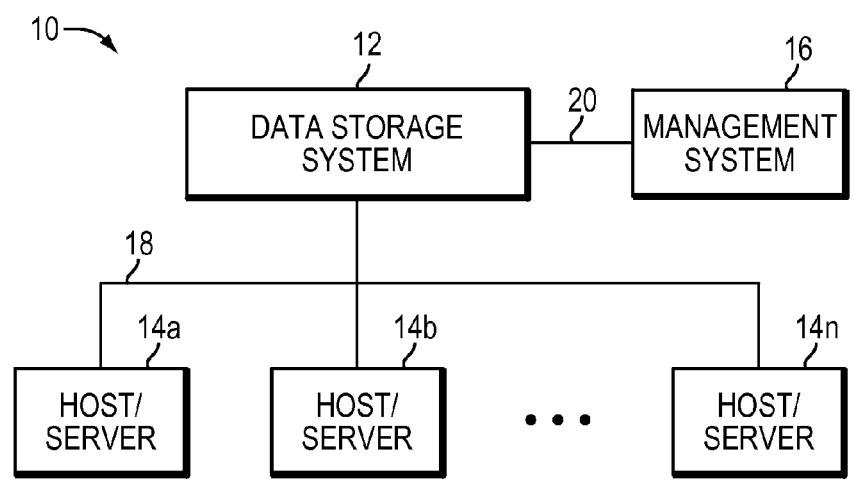
FIGS. 1 and 2A-2B are examples of an embodiment of a computer system that may utilize the techniques described herein.

Described below is a technique for use in managing data deduplication in storage systems, which technique may be used to provide, among other things, performing a data deduplication process by applying a deduplicating technique to data of a deduplication domain, wherein the data deduplication process is scheduled based on a priority, evaluating characteristics of data deduplication performed by the data deduplication process, and based on the evaluation, effecting execution of the data deduplication process.

Data deduplication is a process by which a data storage system can detect multiple identical copies of data and only keep a single copy of that data, thus eliminating the redundant data by removing other copies of that data and thus improving storage utilization. Thus, the data deduplication process has the ability to detect common blocks of data and maintain a single copy of the common blocks, thereby increasing the efficiency of storage devices by storing data in a reduced number of physical blocks. In at least some systems, data deduplication requires iterating over set of data blocks in one or more storage extents of a deduplication domain by processing digest information associated with each data block, finding the data blocks that contain identical information, and mapping the identical data blocks to a single copy of the data. Thus, in a deduplicated system, a single data block may represent a large number such as hundreds of deduplicated data blocks such that each deduplicated data block refers to the single data block stored on a storage device (e.g. a disk). In such systems, an index table of unique digests is created to find commonality among the data set. The size of this index table determines a window of deduplication opportunity. The larger the index table, the more blocks can be checked for duplicates, and thus the larger the opportunity for deduplication. However, a large index table consumes more storage resources and memory of the storage system. Therefore, given a limited amount of memory and/or storage resources, not every block of the storage system can be selected and information for that block stored in an index table. A goal is to schedule iteration of a deduplication domain that includes data blocks that have a high probability of being deduplicated and find those data blocks earlier using the least or a reduced amount of time, memory, and storage resources.

Generally, data deduplication for feature software requires that data blocks in a storage extent be iterated through based on a specific iteration scheme. A set of storage extents that are deduplicated together form a deduplication domain. During iteration of a deduplication domain, an index table of unique digests is created from data blocks that are iterated through. Further, during iteration of data blocks of a deduplication domain, digest for each data block is computed and compared with digests stored in an index table. If a matching digest for a data block is found in an index table, contents of data blocks are compared to verify that the data blocks are duplicates of each other, and the data block is deduplicated to an identical data block associated with the matching digest found in the index table by updating address mapping information of the deduplicated data block to point to the identical data block found using the index table. Further, if no matching digest for a data block is found in an index table, the digest for the data block is added to the index table. Generally, when either data blocks of a deduplication domain are iterated for the first time or a large amount of data is written to the deduplication domain, there is a high probability of finding data blocks that may be deduplicated. However, if either none or few data blocks are changed in a deduplication domain, there is a low probability of finding data blocks that may be deduplicated.

Further, in order to find modified (also referred to herein as "changed") data blocks in a deduplication domain for creating new digest information for the modified data blocks, each data block of the deduplication domain is evaluated. Metadata of a data block is evaluated to determine whether the data block has been modified such that new digest information for the modified data block may be computed. Thus, conventionally, each data block of a deduplication domain is iterated and metadata of each data block is evaluated thereby consuming a large amount of system resources. Further, in such a conventional system, even if a small amount of data has been changed in a deduplication domain, a data deduplication process iterates each data block of the deduplication domain and evaluates metadata of each data block thereby consuming a large amount of time. Further, in such a conventional system, storage space of an index table is used inefficiently by adding digest information for a large number of data blocks that have not changed and thus have a low probability of being deduplicated. Thus, a goal is to avoid adding digest information for data blocks in an index table where the data blocks have a low probability of getting deduplicated.

Generally, a set of deduplication jobs are scheduled for performing a deduplication technique on a set of deduplication domains such that each deduplication job iterates through data blocks of a deduplication domain of the set of deduplication domains. Typically, data deduplication is a process that consumes a large amount of system resources. In order to create an index table for identifying duplicate data blocks, every data block of each of the logical units in a deduplication domain is iterated through and a digest is computed for each data block. Reading a data block results into an I/O operation directed to a logical unit including that data block and computing a digest for the data block consumes CPU resources. Thus, each deduplication job consumes a large amount of memory and/or system resources. Therefore, given a limited amount of memory and/or storage resources, not every deduplication domain of a storage system may be iterated through by a deduplication job at the same time or similar times. Thus, a goal is to limit the number of deduplication jobs that are executed concurrently and efficiently select deduplication domains for executing the deduplication jobs.

Conventionally, a set of deduplication jobs are scheduled by allocating an equal amount of fixed pre-determined time to each deduplication domain. Further, in such a conventional system, a set of deduplication jobs are scheduled in a round-robin manner such that data deduplication is performed on each deduplication domain of a set of deduplication domains in a sequential manner periodically based on a fixed time interval. In such a conventional system, such a scheduling technique does not take into account characteristics of a deduplication domain such as the amount of data that has been modified. As a result, in such a conventional system, a deduplication job may iterate data blocks of a deduplication domain which includes none or only a few data blocks that have been modified. Thus, in such a conventional system, a deduplication job may iterate through metadata of each data block of a deduplication domain and may not find any data block that may be deduplicated. Thus, in such a conventional system, a deduplication job may spend a large amount of time and/or system resources attempting to deduplicate data blocks of a deduplication domain and may find none or a few data blocks that may be deduplicated.

By contrast, in at least some implementations in accordance with the technique as described herein, the current technique dynamically adjusts a time interval after which a deduplication job is scheduled for a deduplication domain and automatically adjusts a priority of the deduplication job based on previous results of performing the deduplication job on the deduplication domain. If a large number of data blocks are deduplicated in a deduplication domain indicating a high rate of data deduplication, the priority of the deduplication domain is updated to a high priority such that the next deduplication job scheduled for the deduplication domain is scheduled sooner than previously scheduled based on the high priority. Thus, in at least one embodiment of the current technique, characteristics of a deduplication domain are evaluated to determine whether there is a high probability of finding duplicate data blocks in the deduplication domain. Based on the evaluation, data deduplication of the deduplication domain is prioritized and scheduled. Further, in at least one embodiment of the current technique, each deduplication domain of a storage system is assigned a priority such that deduplication domains of the storage system are iterated based on respective priority of each deduplication domain. Further, the rate at which data of a deduplication domain is deduplicated is monitored and based on the rate of data deduplication; the priority for scheduling the next iteration of data deduplication is adjusted.

In at least some implementations in accordance with the technique as described herein, the use of the managing data deduplication in storage systems technique can provide one or more of the following advantages: lowering costs by improving deduplication efficiency, improving memory utilization by reducing the index size, and reducing the amount of storage required for data deduplication by adaptively scheduling deduplication jobs to iterate over data blocks in deduplication domains and dynamically changing priorities of deduplication jobs to improve performance of a data deduplication process.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In the following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2A:
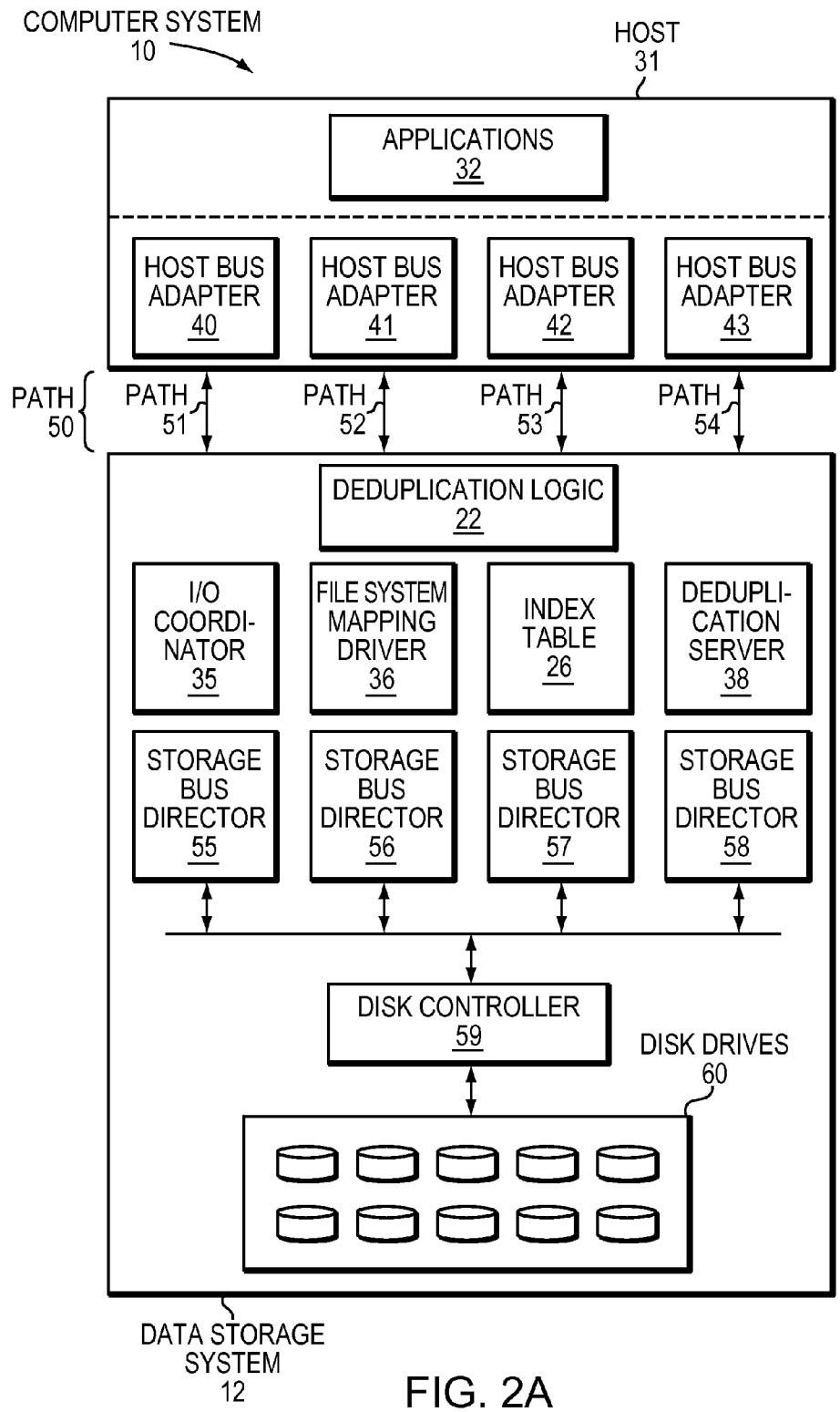
Figure 2B:
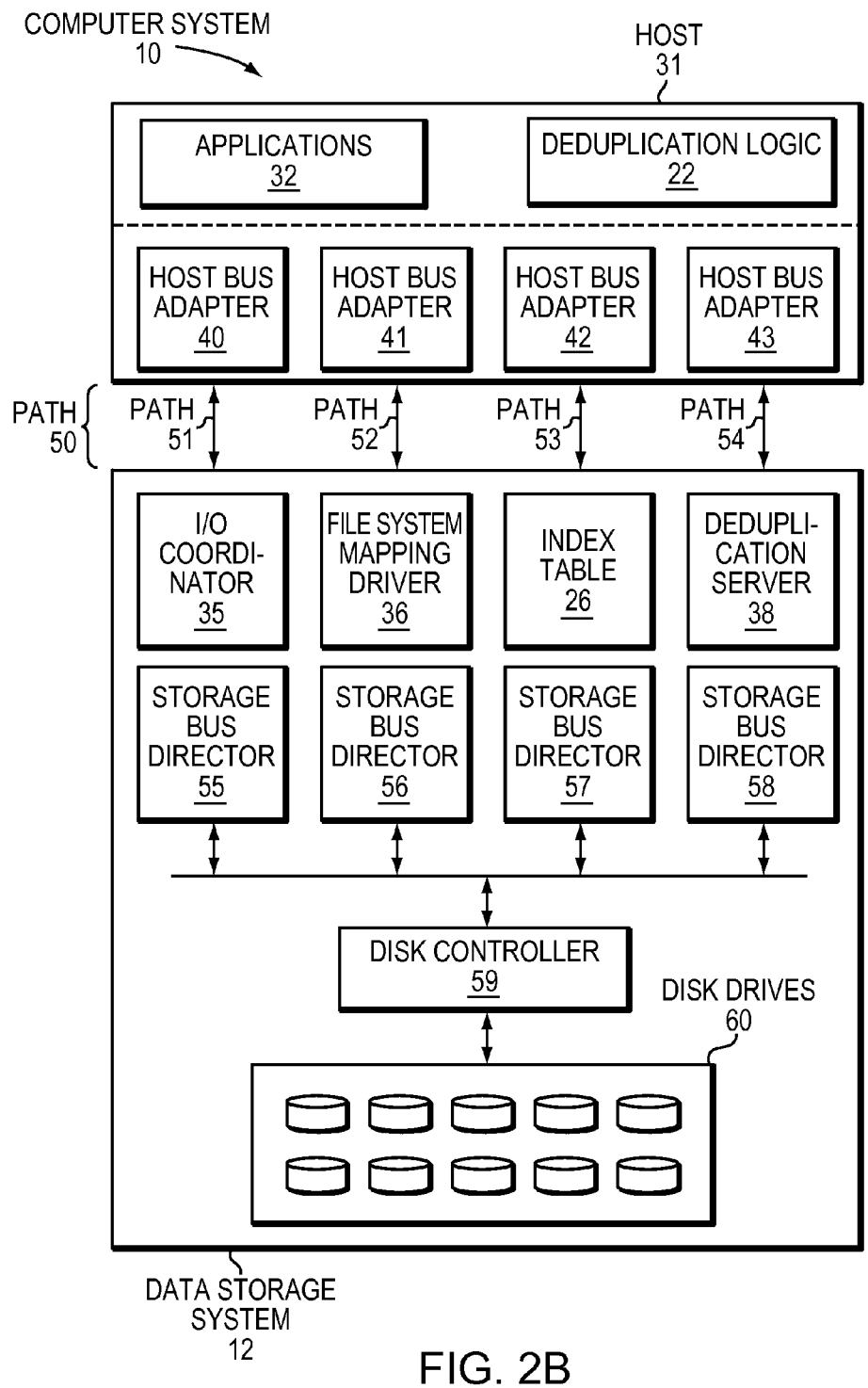

Referring to FIGS. 2A and 2B, shown is a more detailed example of an embodiment of a computer system that may be used in connection with performing the techniques described herein. A computer system 10 may include multiple hosts and multiple data storage systems in such a way that each host may access data on each of data storage systems. For simplicity, however, FIG. 2A and FIG. 2B illustrate a computer system 10 that includes a single host 31 and a single data storage system 12. Applications 32 running on an operating system of host 31 may access data in data storage system 12 via I/O driver and host bus adapters 40, 41, 42, and 43. Host 31 can be, for example, a server, a personal computer, or any other devices capable of initiating read and write requests to data storage system 12. Host 31 has multiple paths 50 for sending I/O requests to data storage system 12. Typically, there are at least two paths from a host to a data storage system. FIGS. 2A and 2B show four paths from host 31 to data storage system 12: path 51, path 52, path 53, and path 54. Each of the paths 50 can be any of a number of different types of communication links that allow data to be passed between data storage system 12 and host 31. Each of the host bus adapters 40, 41, 42, and 43 would be adapted to communicate using an appropriate protocol via the paths 50 with the storage bus directors 55, 56, 57 and 58. For example, path 50 can be implemented as a SCSI bus with host bus adapters 40 and storage bus director 55 each being a SCSI driver. Alternatively, path 50 between the host 31 and the data storage subsystem 12 may be a Fibre Channel fabric. Moreover, a path 50 may include multiple communication path types and may be part of a communication network. Storage bus directors 55, 56, 57 and 58 further communicates with the disk controller 59 to access data stored on the disk drives 60. The disk controller 59 may be configured to perform data storage operations on behalf of the host 31.

In at least one embodiment of the current technique, deduplication logic 22 can be provided on data storage system 12 as shown in FIG. 2A. In an alternative embodiment, deduplication logic 22 may be provided also or instead on a host system, such as host system 31 as shown in FIG. 2B. As described elsewhere herein, deduplication logic 22 may be performed in a manner that is transparent to an application running on a host system. In at least one embodiment of the current technique, deduplication server 38 provides deduplication services in data storage system 12 by working in conjunction with I/O Coordinator 35 and File system mapping driver 36. I/O Coordinator 35 manages I/O operations in conjunction with the file system mapping driver 36. I/O Coordinator 35 provides framework for implementing digest and other I/O requests issued by the deduplication server 38. File system mapping driver 36 is a light-weight file system library that provides file system functionality and allows data storage system 12 to create files within a file system. File system mapping driver 36 processes I/Os directed to metadata of a file system and provides information regarding metadata (e.g., deduplication key, deduplication density) of a data block that is potentially a candidate for deduplication.

Figure 3:
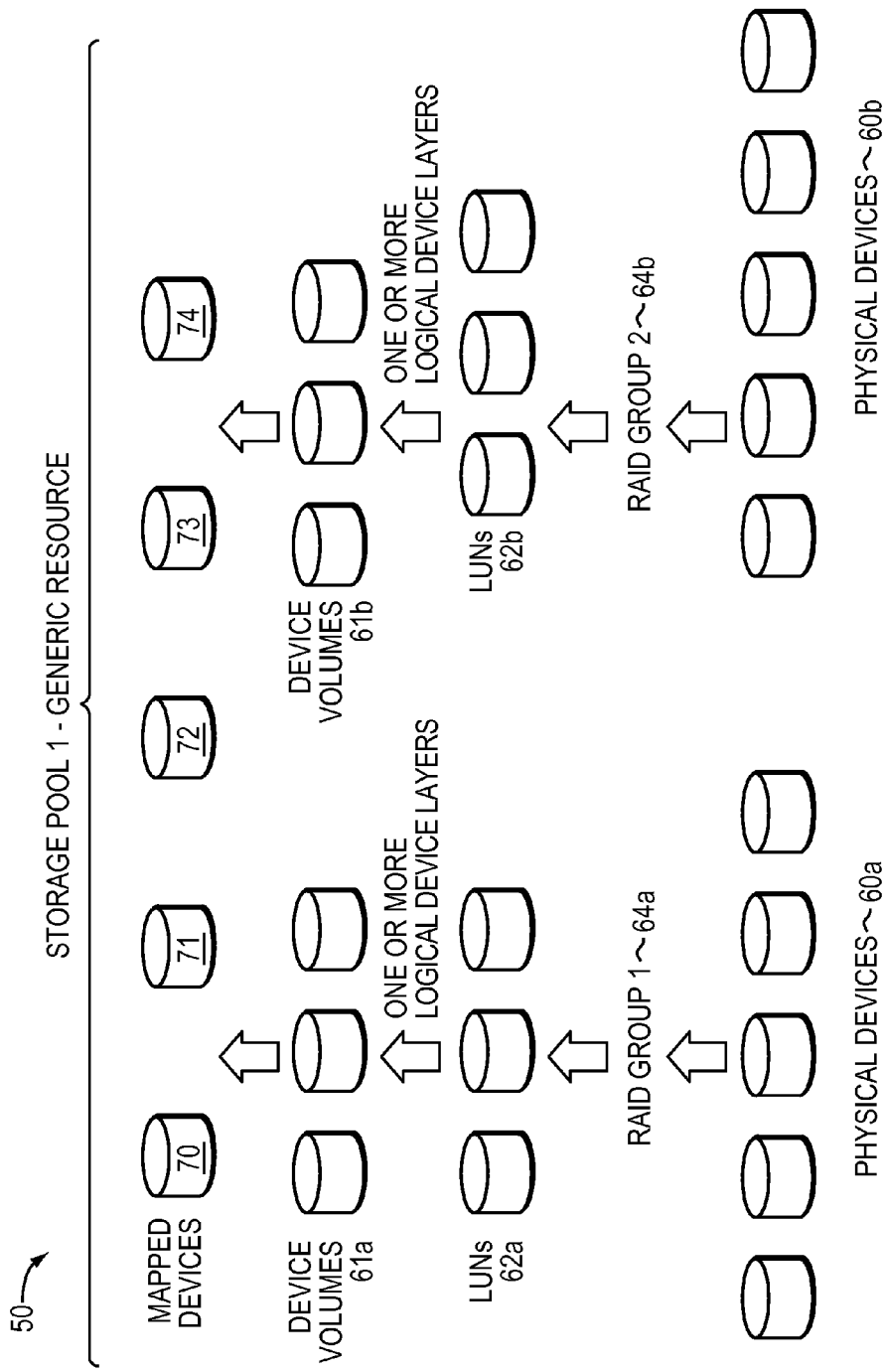
FIG. 3 is an example illustrating storage device layout.

FIG. 3 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62. Thus, a deduplication domain consists of a set of storage extents which includes a set of deduplicated LUNs sharing a common set of blocks.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space. Further, a deduplication domain may be represented by a file system such that the file system may include multiple logical units (LUNs) which may be deduplicated together.

Generally, data deduplication for feature software requires that data blocks in a storage extent be identified for deduplication. A set of storage extents that are deduplicated together form a deduplication domain. Thus, data blocks of a storage extent in the deduplication domain are identified for deduplication processing. Data blocks may be identified for deduplication processing using any one of the known techniques such as iterating the data blocks according to a specific iteration scheme. During the deduplication processing, an index table of unique digests is created from the data blocks that are identified as candidates for deduplication. In such systems, an index table of unique digests is created to find commonality among the data set.

Figure 4:
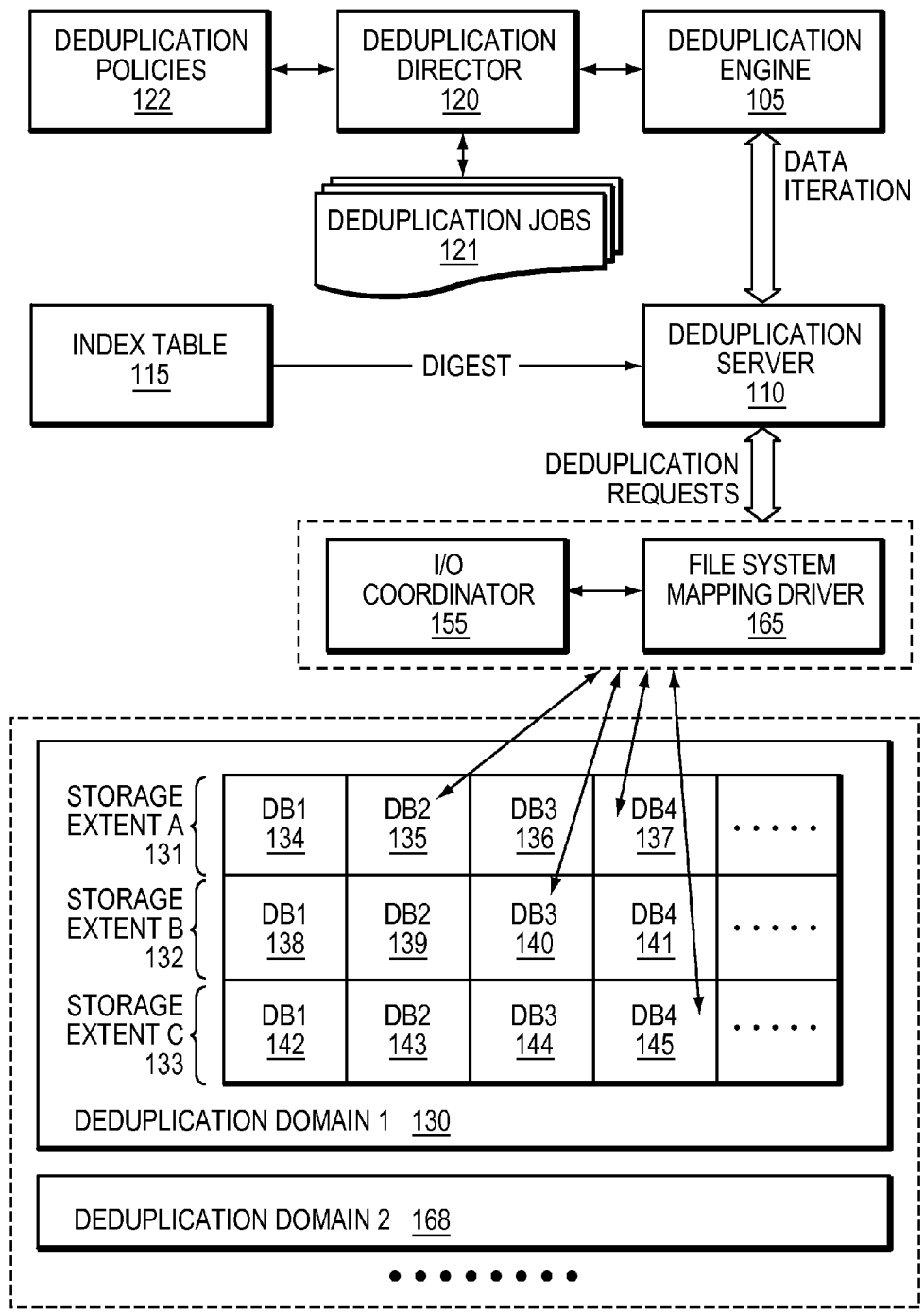
FIG. 4 is diagram illustrating in more detail components that may be used in connection with techniques herein.

Referring to FIG. 4, shown is a more detailed representation of components that may be included in an embodiment using the techniques herein. In a deduplication domain, each storage extent contains a range of data blocks. For example, in FIG. 4, storage extent A 131, storage extent B 132 and storage extent C 133 are part of the deduplication domain-1 130. Within a data storage system 70, there may be multiple deduplication domains such as deduplication domain-1 130, and deduplication domain-2 168. Within a deduplication domain, a goal of a deduplication process is to maintain only a single copy of each unique set of data. Software or other logic executing the deduplication process examines data in the deduplication domain in fixed sized chunks and determines whether the data stored in a chunk is the same as the data stored in another chunk in the same deduplication domain. If so, an address map for the LUNs is manipulated so that respective address map entries for the chunks reference the same physical chunk of data, and then the chunks that currently hold the extra copies of the data are freed up as unused storage. The address map for the LUNs stores a mapping of logical block addresses to physical block addresses. In at least some embodiments of the current technique, the fixed sized chunk can be a data block. For example, in FIG. 4, storage extent A 131 includes data blocks 134-137, storage extent B 132 includes data blocks 138-141 and storage extent C 131 includes data blocks 142-145 and other data blocks (not shown).

In at least one embodiment of the current technique, deduplication director 120 is a process that iterates through deduplication domains including logical units and schedules data deduplication jobs 121 based on deduplication policies 122 to perform data deduplication. Further, deduplication director 120 works in conjunction with deduplication engine 105 to perform data deduplication on deduplication domains 130, 168. Thus, deduplication director 120 is a component responsible for coordinating data deduplication operations. As a result, deduplication director 120 identifies data deduplication domains, manages storage space for performing data deduplication, and manages deduplication engine 105 to process each data deduplication domain.

In at least one embodiment of the current technique, deduplication director 120 performs operations such as discovering a deduplication domain configuration in a storage system, preparing system resources for scheduling deduplication jobs 121, scheduling execution of the deduplication jobs 121 based on policies 122, performing the deduplication jobs 121 on deduplication domains by working in conjunction with deduplication engine 105, monitoring status of the deduplication jobs 121 and providing information regarding execution of the deduplication jobs 121, and managing the system resources for performing data deduplication.

Further, data deduplication engine 105 executes a deduplication job by performing data deduplication on a deduplication domain by iterating through data blocks of the deduplication domain, obtaining digests for the data blocks, identifying deduplication candidates, and issuing deduplication requests to deduplication server 110.

In at least one embodiment of the current technique, deduplication server 110 is a component that provides services to deduplication director 120 to iterate over sets of data in a set of deduplication domains 130, 168. Deduplication server 110 also computes digests and remaps blocks after the deduplication technique is applied to remove duplicate blocks of data. A deduplication database (e.g. an index table) is maintained for a deduplication domain. Deduplication engine 105 communicates with the deduplication server 110 to iterate through the set of deduplication domains 130, 168 and computes digests for data blocks that are iterated through. A digest is created for each chunk of data (e.g., a data block) that is identified as a candidate for deduplication. Deduplication engine 105 detects potential duplicate copies of data and issues a request to the deduplication server 110 to deduplicate the data. The deduplication database is stored on one of the storage extents that include one or more LUNs. An index table 115 may also be maintained on a LUN located in the same pool as the deduplication domain 130. In at least some implementations, an index table is a persistent hash-table of chunk-IDs keyed by the digest of the data stored in the chunk. The index table need not contain entries for every data chunk in the deduplication domain, but the effectiveness of deduplication is a function of the number of entries stored in the index table 115. The more entries in the index table, the more likely that duplicate blocks will be detected during deduplication processing. To accommodate more entries, the index table requires more memory and storage resources. Additionally, if the amount of storage used by the user is in terabytes, it can take days to identify chunks of data for such a large address space of the storage. Thus, the index table typically contains an incomplete set of entries and does not include digests for all of the data inside all of the storage in the deduplication domain.

Generally, data deduplication may be performed in multiple passes (also referred to herein as "iteration") such that each pass of the data deduplication iterates through data blocks of a deduplication domain. Further, each iteration of a data deduplication process may perform data deduplication on each deduplication domain of a storage system for a fixed period of time. Generally, a large amount of time such as days may be required to iterate each data block of a large deduplication domain. For example, 24 hours may be required to iterate over a deduplication domain which is 4 terabytes (TB) in size. Thus, in order to make progress towards data deduplication in each deduplication domain of a storage system, a timer may be defined such that each deduplication job executes for a specific period of time defined by the timer and then waits for the next iteration to start. Further, multiple deduplication jobs may be executed concurrently during the time period indicated by a timer.

Thus, in at least one embodiment of the current technique, deduplication director 120 schedules deduplication jobs in a time-period based approach such that a first subset of deduplication jobs are executed concurrently for a specific time period and upon expiration of the specific time period, a next subset of deduplication jobs is scheduled. Thus, for example, if a storage system includes 10 deduplication domains, the first iteration of data deduplication may include scheduling four deduplication jobs that may execute concurrently for a specific period of time to iterate through four deduplication domains. In such a case, a fifth deduplication job waits until either one of the four deduplication jobs finishes or the specific period of time ends for one of the four deduplication jobs. Further, in such an example, when either the first four deduplication jobs finishes or the specific period of time ends, next four deduplication jobs are scheduled. However, in such an example, as soon as any one of the four deduplication jobs finishes, the next deduplication job may be scheduled. Further, when each of the ten deduplication jobs is executed during the first iteration, the second iteration starts execution of first four deduplication jobs again. Thus, the second iteration of data deduplication is performed similar to the first iteration.

Further, when deduplication jobs are initially started, each deduplication job is scheduled and executed with the same priority. However, based on the rate at which data of a deduplication domain is deduplicated, the priority of a deduplication job which performs data deduplication on deduplication domain is adjusted. Thus, at the end of an iteration of data deduplication, the priority of a deduplication job may be adjusted based on information regarding how a deduplication domain is deduplicated by the deduplication job. Further, during an iteration of data deduplication, deduplication director 120 may decide to skip scheduling low priority deduplication jobs. For example, deduplication director 120 may schedule three deduplication jobs out of the total of five deduplication jobs during iteration. Further, deduplication director 120 schedules deduplication jobs based on a policy which may include the priority of a deduplication job. Further, deduplication engine 105 maintains statistical information regarding data deduplication performed by deduplication jobs on deduplication domains. Such statistical information may be used by deduplication director 120 for adjusting priority of deduplication jobs 121. Further, deduplication director may make a determination as to how long ago a low priority deduplication domain has been iterated through and based on the determination, may forcibly schedule a data deduplication job for the low priority deduplication domain.

Further, deduplication director 120 may set a time delay between execution of two deduplication jobs in order to avoid performing repeated and frequent iterations of data blocks. Further, deduplication director 120 may increase the time interval between executions of two iterations of a deduplication job on a deduplication domain if the rate at which data of the deduplication domain is deduplicated is less than a specific threshold.

During deduplication processing as described herein, deduplication server 110 provides services to deduplication engine 105 by interacting with I/O coordinator 155 and file system mapping driver 165. Deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., index table 115) that maintains a digest (e.g., SHA, checksum) for each block. When two blocks have the same digest they have a sufficiently high probability of containing the same data to warrant a bit-for-bit comparison to confirm they are exact duplicates. Remapping leverages dynamic block-mapping technology of file system mapping driver 165. A file system allows dynamic manipulation of the address maps that connects LUN's logical address space to its physical address space. The file system also allows mapping a single block of storage at multiple locations within the file system, and allows handling of writes to shared blocks by allocating new storage and updating the shared address mappings. I/O coordinator 155 manages I/O operations in conjunction with the file system mapping driver 165. I/O coordinator 155 provides framework for implementing digest and other I/O requests issued by the deduplication server 110.

Thus, deduplication engine 105 and deduplication server 110 working in conjunction with one another identify data blocks for deduplication, compare data digest information of the data blocks, identify candidate data blocks for deduplication, issue deduplication requests, and maintain index table 115. Further, I/O coordinator 155 and file system mapping driver 165 working in conjunction with one another process deduplication requests received from deduplication server 110. File system mapping driver 165 performs a deduplication operation by freeing up redundant instances of a deduplicated data block.

Figure 5:
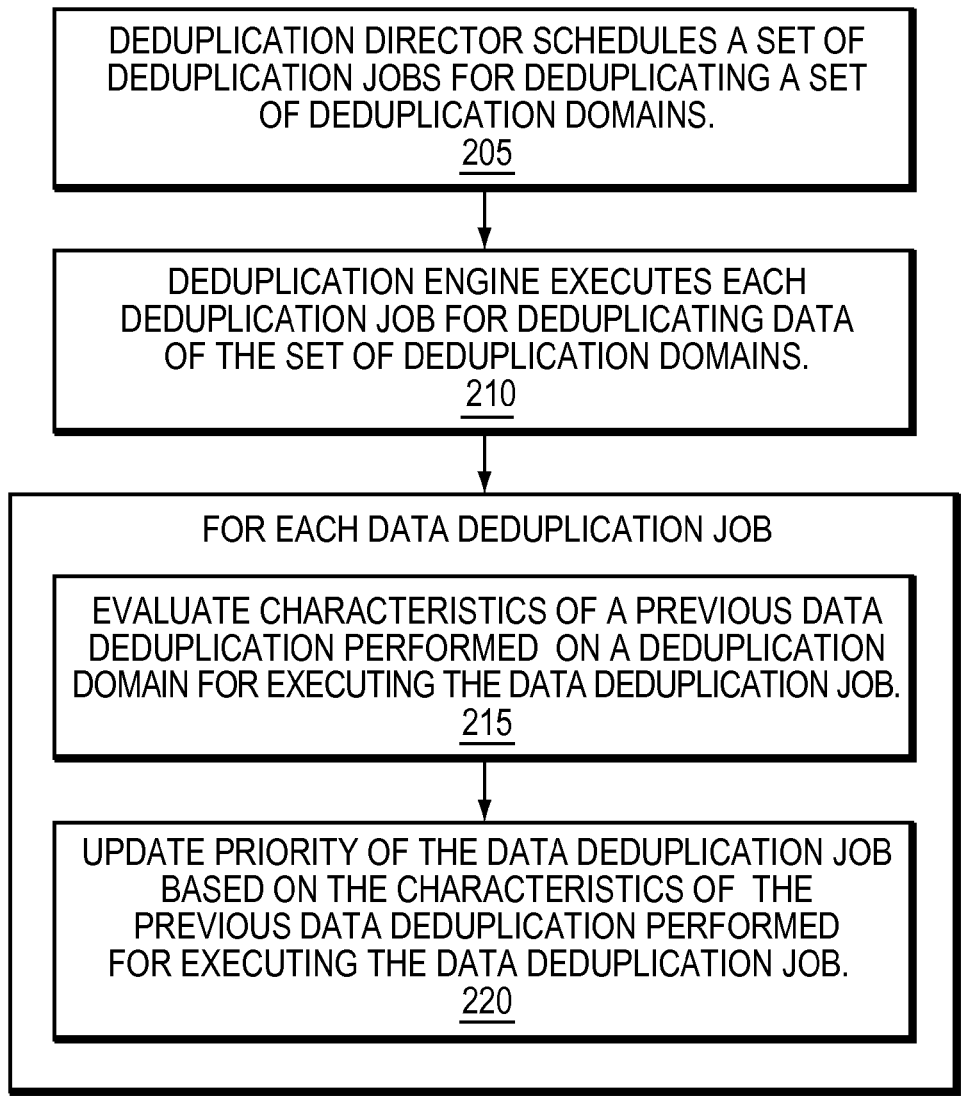
FIGS. 5-7 are flow diagrams illustrating processes that may be used in connection with techniques herein.

Referring to FIG. 5, shown is a flow diagram illustrating a flow of data in the data storage system. With reference also to FIG. 4, deduplication director 120 schedules a set of deduplication jobs for deduplicating a set of deduplication domains (step 205). Deduplication engine 105 executes each deduplication job of the set of deduplication jobs for deduplicating data of the set of deduplication domains (step 210). For each deduplication job of the set of deduplication jobs scheduled by the deduplication director 120, characteristics of data deduplication performed on a deduplication domain by the deduplication job is evaluated (step 215). Based on the evaluation of the characteristics of data deduplication performed on the deduplication domain by the deduplication job, priority of the the deduplication job is updated (step 220).

Figure 6:
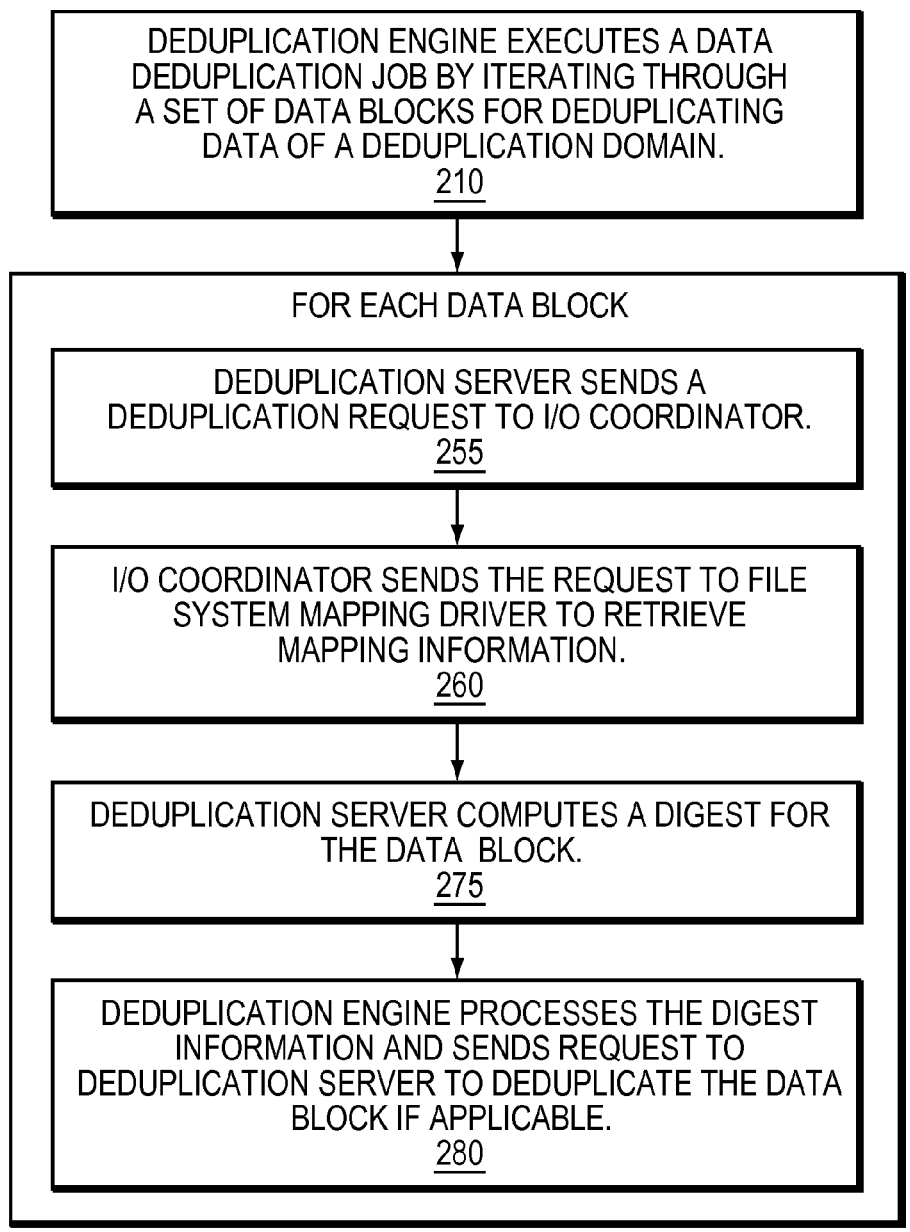

Referring to FIG. 6, shown is a more detailed flow diagram illustrating a flow of data in the data storage system. With reference also to FIG. 4, deduplication engine 105 executes a data deduplication job by iterating through a set of data blocks of a deduplication domain for deduplicating the set of data blocks (step 210). For each data block of the set of data blocks, deduplication server 110 sends a deduplication request to I/O coordinator 155 (step 255). Further, I/O coordinator 155 sends the deduplication request to file system mapping driver 165 to retrieve address mapping information for a data block associated with the deduplication request (step 260). Deduplication server 110 computes a digest for the data block in order to deduplicate the data block (step 275). Deduplication engine 105 processes the digest and sends a request to deduplication server 110 to deduplicate the data block upon identifying a candidate data block to which the data block may be deduplicated (step 280).

Figure 7:
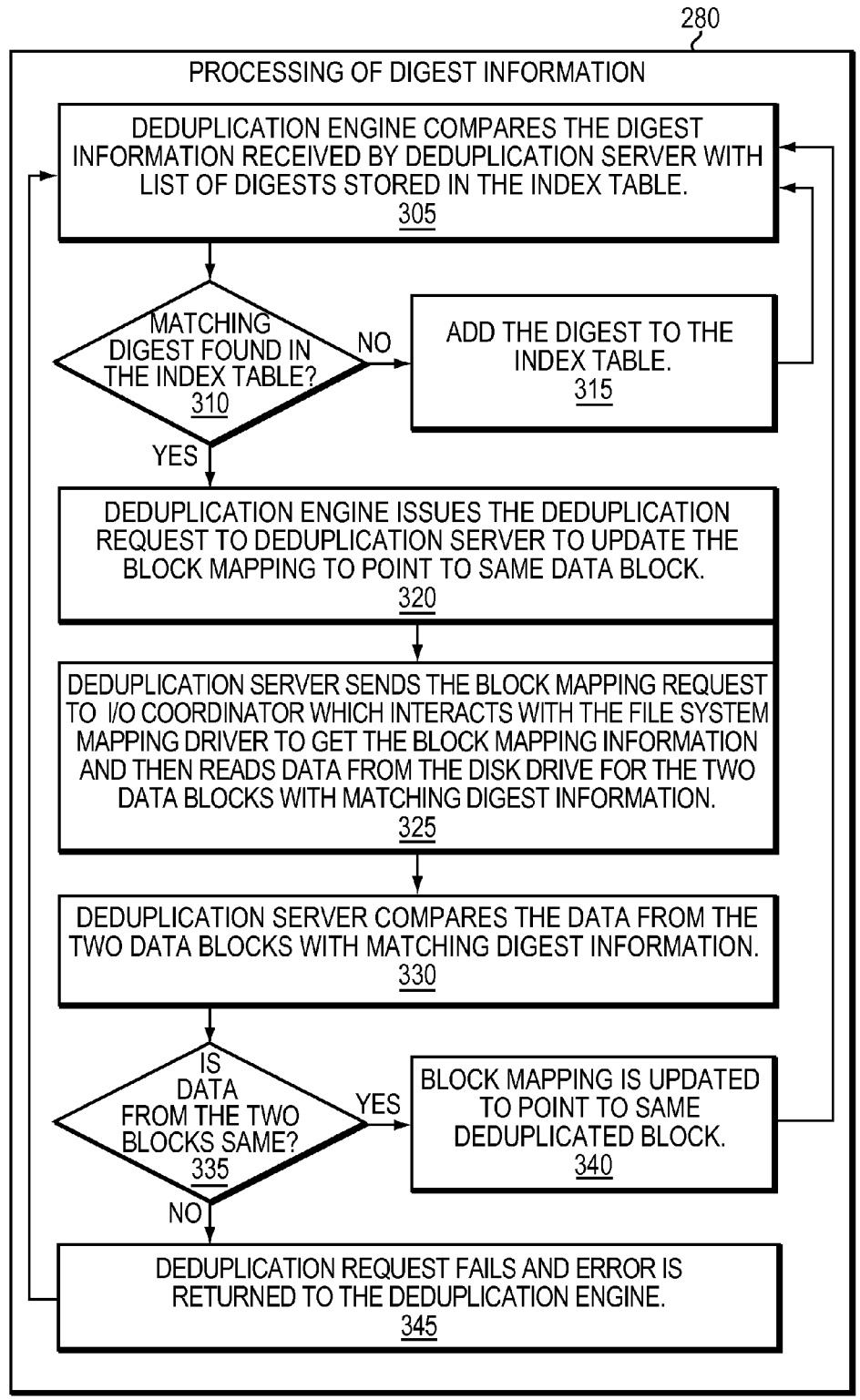

Referring now to FIG. 7 that illustrates a process of processing digest information for identifying a candidate data block for deduplication. With reference also to FIG. 4, deduplication engine 105 compares the digest information for the data block received from deduplication server 110 with list of digests stored in the index table 115 (step 305). If a matching digest is found in the index table 115 (step 310), deduplication engine 105 sends a deduplication request to deduplication server 110 indicating that a candidate data block associated with the matching digest has been identified for deduplicating the data block (step 320). A matching digest found in the index table 115 indicates that the data block likely contains exact same data as data stored in the candidate data block corresponding to the matching digest. However, if no matching digest is found in the index table 115, the digest of the data block is added to the index table 115 (step 315).

Further, deduplication engine 105 issues a request to the deduplication server 110 to update block mapping information in order to deduplicate the data block with the candidate data block. Deduplication server 110 sends a request to update the block mapping information to the I/O coordinator 155 which further issues a mapping request to the file system mapping driver 165 to find physical address of the data block (step 325). If the mapping request completes successfully, the I/O coordinator 155 reads the data from the data block located at the physical address indicated by the mapping. The deduplication server 110 issues a read request for the candidate data block as well. The read request for the candidate data block is processed identically to the first read request. When the second read request completes, deduplication server 110 compares the data read from the data block with the data read from the candidate data block (step 330). If the data of the data block is not same as the data of the candidate data block, the request to deduplicate the data blocks fails and an error is returned back to the deduplication engine 105 (step 345). If the data of the data block is identical to the data of the candidate data block, the I/O coordinator 155 requests file system mapping driver 165 to deduplicate the two identical data blocks. If the data blocks are successfully deduplicated, the address mapping of the data block is updated to point to a single copy of the data (i.e. the address map of the data block now points to the address map of the candidate data block) (step 340). If the data blocks are not successfully deduplicated, an error is returned back to the deduplication engine 105 to update its index table accordingly (step 345).

Further, a data block may be deduplicated to more than one data block. In such a case, at step 340 in FIG. 7, a determination is made as to whether the data block associated with matching digest entry found in the index table has already been shared with other data blocks. Upon determining that the data block has been deduplicated previously, the matching entry found in the index table is updated to indicate the recent data block that has been deduplicated to this data block in step 340.

Thus, in at least one embodiment of the current technique, the current technique improves the efficiency of a data deduplication process by scheduling deduplication jobs on deduplication domains that have a high probability of being deduplicated. Thus, in at least one embodiment of the current technique, maximum and minimum thresholds are maintained for managing time intervals between scheduling two subsequent iterations of a deduplication job for a deduplication domain. Further, a priority is maintained for a deduplication job indicating how much time deduplication director 120 waits before scheduling the next iteration of the deduplication job again and determines which deduplication job to schedule during the next iteration of data deduplication. When a deduplication job is executed initially for a deduplication domain, the priority (also referred to herein as "scheduling priority") is set to a high value. In such a case, when the deduplication job stops, the priority of the deduplication job is adjusted based on information such as the number of digests generated during iteration of data blocks of the deduplication domain and the number of successful deduplication requests performed during the execution of the deduplication job. The priority of the deduplication job is increased if the number of digests generated during iteration of data blocks of the deduplication domain and the number of successful deduplication requests exceeds a specific threshold value. Similarly, the priority of the deduplication job is decreased if the number of digest generated during iteration of data blocks of the deduplication domain and the number of successful deduplication requests are below a specific threshold value. Further, the priority of a deduplication job may also be adjusted based on specific events that may indicate addition of a large amount of new data to the deduplication domain. Thus, by focusing system resources on deduplication domains where data blocks have a high probability of getting deduplicated, utilization of system resources is improved while increasing the efficiency of data deduplication because data deduplication is dynamically adjusted between multiple iterations of data blocks based on how data is deduplicated during each of those iterations.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data deduplication in storage systems, the method comprising:

performing a data deduplication process by applying a deduplicating technique to data of a set of deduplication domains, wherein a set of data deduplication processes is scheduled for the set of deduplication domains, wherein each data deduplication process of the set of data deduplication processes iterates over data of a deduplication domain of the set of deduplication domains based on a respective priority associated with each deduplication domain, wherein each data deduplication process of the set of data deduplication processes iterates over data concurrently with other data deduplication processes, wherein a priority associated with a deduplication domain indicates an amount of time after which a next iteration is scheduled for the deduplication domain;

evaluating characteristics of data deduplication performed on each deduplication domain of the set of deduplication domains by the respective data deduplication process during a previous iteration, wherein evaluating the characteristics of data deduplication includes determining the rate at which data of each deduplication domain is deduplicated and a probability of determining duplicate data blocks in each deduplication domain during a next iteration; and based on the evaluation, effecting execution of the respective data deduplication process for each deduplication domain, wherein effecting execution of the respective data deduplication process for each deduplication domain includes updating the respective priority associated with each deduplication domain for scheduling the next iteration, wherein updating a priority associated with a deduplication domain includes changing an amount of time after which a next iteration is scheduled for the deduplication domain.

2. The method of claim 1, further comprising:
evaluating the rate at which the data of a deduplication domain of the set of deduplication domains is deduplicated; and
based on the evaluation, adjusting the priority of the data deduplication process after applying the deduplicating technique to the data of the deduplication domain.

3. The method of claim 1, further comprising:
determining the amount of time elapsed since last time the deduplicating technique has been applied to a deduplication domain of the set of deduplication domains; and
based on the determination, adjusting the respective priority of the data deduplication process.

4. The method of claim 1, wherein the data includes a data block, wherein the data block is a fixed size chunk of physical disk storage.

5. The method of claim 1, wherein the deduplication domain comprises a set of storage extents, wherein each storage extent of the set of storage extents comprises a set of LUNs, each LUN of the set of LUNs is a logical representation of a subset of physical disk storage.

6. The method of claim 1, wherein a digest is associated with a data block, wherein the digest is based on contents of the data block and uniquely identifies the data block.

7. The method of claim 1, wherein the deduplicating technique uses an index table, wherein the index table comprises a set of index entries, wherein each index entry of the set of index entries is associated with a digest of a data block.

8. The method of claim 1, wherein applying the deduplicating technique further comprising:
computing a digest for a data block; and
processing the digest for the data block.

9. A system for use in managing data deduplication in storage systems, the system comprising:
a processor configured to:
perform a data deduplication process by applying a deduplicating technique to data of a set of deduplication domains, wherein a set of data deduplication processes is scheduled for the set of deduplication domains, wherein each data deduplication process of the set of data deduplication processes iterates over data of a deduplication domain of the set of deduplication domains based on a respective priority associated with each deduplication domain, wherein each data deduplication process of the set of data deduplication processes iterates over data concurrently with other data deduplication processes, wherein a priority associated with a deduplication domain indicates an amount of time after which a next iteration is scheduled for the deduplication domain;
evaluate characteristics of data deduplication performed on each deduplication domain of the set of deduplication domains by the respective data deduplication process during a previous iteration, wherein evaluating the characteristics of data deduplication includes determining the rate at which data of each deduplication domain is deduplicated and a probability of determining duplicate data blocks in each deduplication domain during a next iteration; and
effect, based on the evaluation, execution of the respective data deduplication process for each deduplication domain, wherein effecting execution of the respective data deduplication process for each deduplication domain includes updating the respective priority associated with each deduplication domain for scheduling the next iteration, wherein updating a priority associated with a deduplication domain includes changing an amount of time after which a next iteration is scheduled for the deduplication domain.

10. The system of claim 9, further comprising:
evaluate the rate at which the data of a deduplication domain of the set of deduplication domains is deduplicated; and
adjust, based on the evaluation, the priority of the data deduplication process after applying the deduplicating technique to the data of the deduplication domain.

11. The system of claim 9, further comprising:
determine the amount of time elapsed since last time the deduplicating technique has been applied to a deduplication domain of the set of deduplication domains; and
adjust, based on the determination, the respective priority of the data deduplication process.

12. The system of claim 9, wherein the data includes a data block, wherein the data block is a fixed size chunk of physical disk storage.

13. The system of claim 9, wherein the deduplication domain comprises a set of storage extents, wherein each storage extent of the set of storage extents comprises a set of LUNs, each LUN of the set of LUNs is a logical representation of a subset of physical disk storage.

14. The system of claim 9, wherein a digest is associated with a data block, wherein the digest is based on contents of the data block and uniquely identifies the data block.

15. The system of claim 9, wherein the deduplicating technique uses an index table, wherein the index table comprises a set of index entries, wherein each index entry of the set of index entries is associated with a digest of a data block.

16. The system of claim 9, wherein applying the deduplicating technique further comprising:
compute a digest for a data block; and
process the digest for the data block.

* * * * *